Patented May 19, 1936

2,041,512

UNITED STATES PATENT OFFICE 2,041,512

TETRAHALOGENO-ORTHO-AMINOPHENOLS

Max Raeck, Dessau-Haideburg in Anhalt, Germany, assignor to General Aniline Works, Inc., New York, N. Y., a corporation of Delaware No Drawing. Application September 26, 1935, Serial No. 42,278. In Germany November 24, 1934

9 Claims. (Cl. 260—130.5)

The present invention relates to a process of manufacturing tetrahalogeno-ortho-aminophenol.

According to Th. Zincke (Berichte der deutschen Chemischen Gesellschaft 21 (1888), 2724) the chlorination of 2-amino-1-hydroxybenzene hydrochloride in glacial acetic acid produces tetrachloro-2-amino-1-hydroxybenzene. Investigation has shown, however, that the analyzed product is not an individual body but a mixture of the hydrochlorides of several highly chlorinated ortho-aminophenols. Thus Zincke did not in fact have in his hands the tetrachloro-ortho-aminophenol. Later, Bures and Havlinova (Chemisches Zentralblatt 1929, II, 1403) claim to have produced tetrachloro-ortho-aminophenol as a by-product in the saponification of tetrachloroacetyl-ortho-anisidine with caustic soda lye. A technical process for making tetrachloro-2-amino-1-hydroxybenzene has not been founded, however, on this prior literature.

By the present invention 3,4,5,6-tetrahalogen-2-amino-1-hydroxybenzenes are made on a commercial scale in very good yield and purity by converting the easily accessible mono-, di-, or trihalogeno-2-amino-1-hydroxybenzenes, substituted by halogen at least in the 6-position, by treatment with phosgene into the corresponding oxazolone, halogenating this body, for example, chlorinating it or brominating it, so as to obtain the 2-oxo-4,5,6,7-tetrahalogenobenzoxazoledihydride-(2,3) of the formula

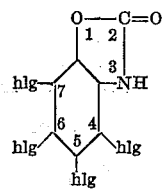

hlg meaning halogen, and finally saponifying the oxazole ring. There is thus obtainable, for instance, 3,4,5,6-tetrachloro-2-amino-1-hydroxybenzene, 3,4,6-trichloro-5-bromo-2-amino-1-hydroxybenzene, 4,6-dichloro-3,5-dibromo-2-amino-1-hydroxybenzene, 3,4,5,6-tetrabromo-2-amino-1-hydroxybenzene and similar compounds.

These bodies are useful as intermediate products for the manufacture of dyes and pharmaceutical preparations.

The following examples illustrate the invention, the parts being by weight:—

Example 1.—42.5 parts of 3,4,6-trichloro-2-amino-1-hydroxybenzene are dissolved in a solution of 8 parts of solid sodium hydroxide in 1600 parts of water and into the solution, at 0 to 5° C., phosgene is passed until there is no more diazotizable matter present. The separated 2-oxo-4,5,7-trichlorobenzoxazoledihydride-(2,3) of the formula

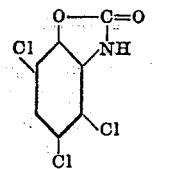

is filtered and washed with water. The paste thus obtained is dissolved hot in a solution of 18 parts of sodium carbonate in 1150 parts of water; then at 20 to 25° C., chlorine is introduced into the solution until the reaction is distinctly acid to congo. In the course of the chlorination the product is precipitated. When chlorination is complete, the whole is heated for one hour to 80 to 85° C., and then sodium carbonate is strewn in until Brilliant yellow test paper is powerfully reddened; hereupon 5 parts of crystallized sodium sulfite are added and finally, after stirring for about ¼ hour, the mass is filtered. The filtrate is acidified while hot until there is only a feeble acid reaction to congo and the separated 2-oxo-4,5,6,7-tetrachlorobenzoxazoledihydride-(2,3) is filtered.

This body is introduced into a solution of 28 parts of solid sodium hydroxide in 750 parts of water and the whole is boiled for 2 hours in a reflux apparatus. The mixture is mixed with hydrochloric acid until the reaction is quite feebly acid to congo, whereupon the precipitated 3,4,5,6-tetrachloro-2-amino-1-hydroxybenzene is filtered, washed and dried. The yield amounts to 44 parts, which is about 90 per cent. of the theoretical, calculated on the trichloro-2-amino-1-hydroxybenzene used.

Example 2.—The 2-oxo-4,5,7-trichlorobenzoxazoledihydride-(2,3), obtained as described in Example 1 from 42.5 parts of 3,4,6-trichloro-2-amino-1-hydroxybenzene, is dissolved in a solution of 18 parts of sodium carbonate in 1150 parts of water. 35 parts of bromine are then allowed to drop into the solution and the whole is heated after 2 hours at 85° C., and the product worked up as described in Example 1. The 2-oxo-4,5,7-trichloro-6-bromobenzoxazoledihydride-(2,3), which melts at 266° C., is saponified as described in Example 1 and there is obtained in this manner a good yield of 3,4,6-trichloro-5-bromo-2-amino-1-hydroxybenzene.

Example 3.—16.95 parts of 2-oxo-7-chlorobenzoxazoledihydride-(2,3) of melting point 228° C., obtainable by treating 6-chloro-2-amino-1-hydroxybenzene with phosgene, are treated in 400 parts of boiling glacial acetic acid with chlorine until there is an increase of 14 parts. The main portion of the acetic acid is now distilled and the residue mixed with water; the substance separated from the water is dissolved in a boiling solution of 12 parts of anhydrous sodium carbonate and the solution is mixed with 2 parts of crystallized sodium sulfite and filtered. The filtrate is mixed with hydrochloric acid until the reaction to Congo paper is feebly acid and the precipitated body is then filtered and dried. After recrystallization from alcohol this body, which is 2-oxo-4,5,6,7-tetrachlorobenzoxazoledihydride-(2,3) is obtained in a yield of 40 per cent. of the theory; the 3,4,5,6-tetrachloro-2-amino-1-hydroxybenzene may be obtained from it as described in Example 1.

Example 4.—20.4 parts of 2-oxo-5,7-dichlorobenzoxazoledihydride-(2,3) of melting point 206 to 207° C. are dissolved together with 24 parts of anhydrous sodium carbonate in 800 parts of water; at 20 to 25° C. chlorine gas is introduced until the reaction is clearly acid to congo. In the course of the chlorination the product is precipitated. When chlorination is completed the whole is heated for 1 hour to 80 to 85° C. and then sodium carbonate is strewn in until Brilliant yellow test paper is strongly reddened. There are now added 2.5 parts of crystallized sodium sulfite and after a quarter of an hour acid is added until the reaction is feebly acid to congo. 2-oxo-4,5,6,7-tetrachlorobenzoxazoledihydride-(2,3) separates; it is saponified with caustic soda lye to produce 3,4,5,6-tetrachloro-2-amino-1-hydroxybenzene.

Example 5.—Instead of the chlorine gas prescribed in Example 4, 50 parts of bromine are used, whereby there is obtained, by following the directions in Example 4, the 2-oxo-5,7-dichloro-4,6-dibromobenzoxazoledihydride-(2,3) of melting point 274° C. By alkaline saponification of this body there is obtained 4,6-dichloro-3,5-dibromo-2-amino-1-hydroxybenzene with a yield of 70 per cent. of the theory. The 4,6-dichloro-3,5-dibromo-2-amino-1-hydroxybenzene blackens when rapidly heated at 190 to 200° C. without melting.

By chlorination of the 2-oxo-5,7-dibromobenzoxazoledihydride-(2,3) (melting point 253 to 254° C.) there occurs a partial exchange of bromine for chlorine, so that a mixture of different tetrahalogen derivatives is obtained. These can be separated from each other only with difficulty.

By brominating 2-oxo-5,7-dibromobenzoxazoledihydride-(2,3) there is obtained 2-oxo-4,5,6,7-tetrabromobenzoxazoledihydride-(2,3) of melting point 294° C. By saponification 3,4,5,6-tetrabromo-2-amino-1-hydroxybenzene is obtained which blackens at 185° C. and at 280 to 290° C. liquefies while swelling.

Example 6.—37.2 parts of 2-oxo-4,5,7-tribromobenzoxazoledihydride-(2,3) are treated with chlorine as described in Example 3. In consequence of partial substitution of chlorine for bromine a mixture of various tetrahalogenderivatives is obtained.

By brominating 2-oxo-4,5,7-tribromobenzoxazoledihydride-(2,3) there is obtained in good yield 1-oxo-4,5,6,7-tetrabromobenzoxazoledihydride-(2,3). By saponification of this a 3,4,5,6-tetrabromo-2-amino-1-hydroxybenzene is obtained.

The present invention is a continuation-in-part of my copending application Ser. No. 745,101, filed September 22, 1934, in which that part of the present specification was disclosed which corresponds to the present Examples 1 to 3.

What I claim is:—

1. The process which comprises reacting a halogeno-2-amino-1-hydroxybenzene of the general formula $$C_6H_{4-n}hlg_nOH(1)NH_2(2)$$

hlg meaning halogen, $n$ meaning 1, 2 or 3, substituted by halogen at least in the 6-position with phosgene to form the corresponding oxazolone, halogenating this compound and saponifying the oxazole ring.

2. The process which comprises reacting a halogeno-2-amino-1-hydroxybenzene of the general formula $$C_6H_{4-n}Cl_nOH(1)NH_2(2)$$

$n$ meaning 1, 2 or 3, substituted by chlorine at least in the 6-position with phosgene to form the corresponding oxazolone, halogenating this compound and saponifying the oxazole ring.

3. The process which comprises reacting a halogeno-2-amino-1-hydroxybenzene of the general formula $$C_6H_{4-n}Cl_nOH(1)NH_2(2)$$

$n$ meaning 1, 2 or 3, substituted by chlorine at least in the 6-position with phosgene to form the corresponding oxazolone, chlorinating this compound and saponifying the oxazole ring.

4. The process which comprises reacting 4,6-dichloro-2-amino-1-hydroxybenzene with phosgene to form the oxazole of the formula

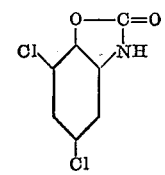

halogenating this compound and saponifying the oxazole ring.

5. The process which comprises reacting 4,6-dichloro-2-amino-1-hydroxybenzene with phosgene to form the oxazole of the formula

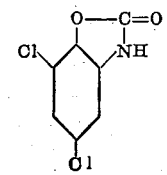

chlorinating this compound and saponifying the oxazole ring.

6. 3,4,5,6-tetrabromo-2-amino-1-hdroxybenzene.

7. 4,6-dichloro-3,5-dibromo-2-amino-1-hydroxybenzene.

8. The 1-hydroxy-2-aminohalogenobenzols of the general formula:
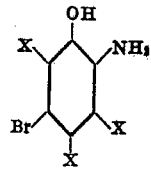
wherein X means a halogen of the group consisting of Br and Cl.
9. The process which comprises reacting 4,6-dichloro-2-amino-1-hydroxybenzene with phosgene to form the oxazole of the formula:
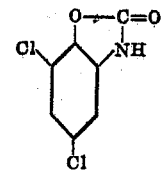
brominating this compound and saponifying the oxazole ring.
MAX RAECK.